Oct. 7, 1952     T. MAIRS     2,612,858
MARINE ENGINE WATER COOLER
Filed May 17, 1948     2 SHEETS—SHEET 1

INVENTOR.
Thomas Mairs
BY

Oct. 7, 1952             T. MAIRS             2,612,858
MARINE ENGINE WATER COOLER
Filed May 17, 1948             2 SHEETS—SHEET 2
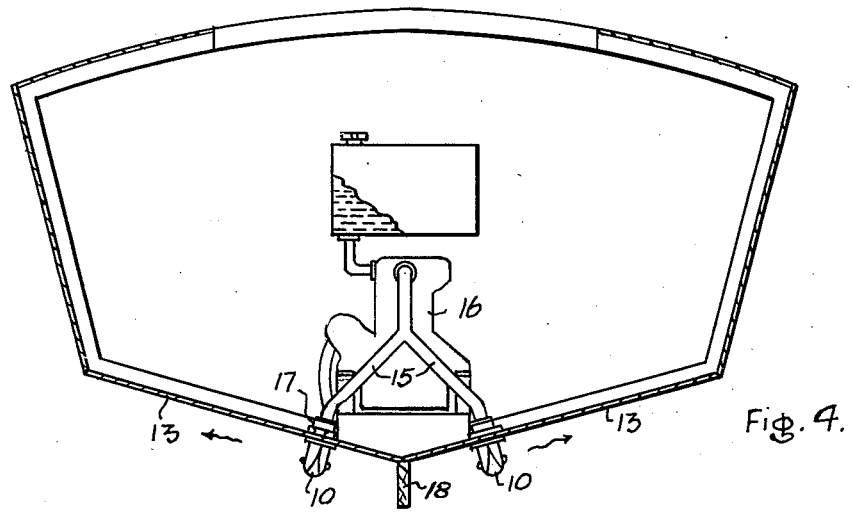
Fig. 4.
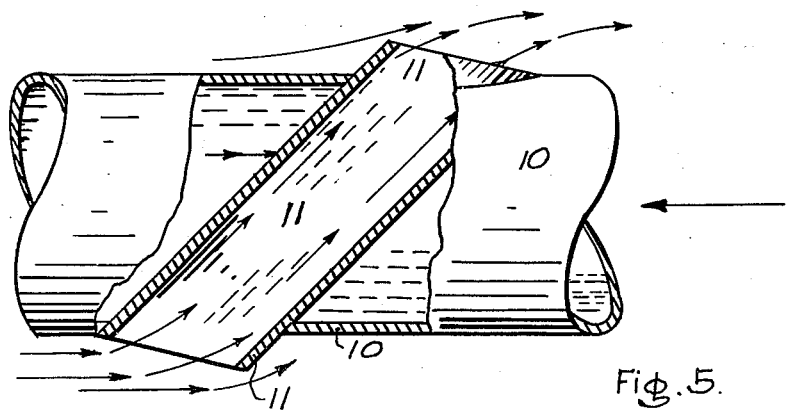
Fig. 5.
INVENTOR
Thomas Mairs
BY 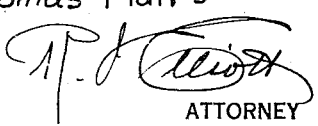
ATTORNEY Patented Oct. 7, 1952

2,612,858

UNITED STATES PATENT OFFICE 2,612,858

MARINE ENGINE WATER COOLER

Thomas Mairs, Tacoma, Wash.

Application May 17, 1948, Serial No. 27,402

1 Claim. (Cl. 115—0.5)

This invention relates to devices for cooling the water or other coolant used for cooling the engine of the internal combustion type and for other similar purposes, wherein the circulating engine water is conducted through piping immersed in the cold water outside the boat.

The objects of my invention are to provide means for cooling the circulating water which will cause the least resistance to the forward motion of the boat; which, on account of its efficiency, will provide a sufficient cooling effect for a relatively large engine; which secures a quick change of cold water through the device independent of the direction of motion of the boat; which is made in a complete unit and therefore may be installed under the bottom of any new or old boat without the necessity of hiring skilled labor; which is simple and rugged in construction, quick and easy to install, and highly efficient in use.

I attain these and other objects as will readily be perceived by those skilled in the art, by the devices and arrangements illustrated in the accompanying drawings, in which—

Figure 1:
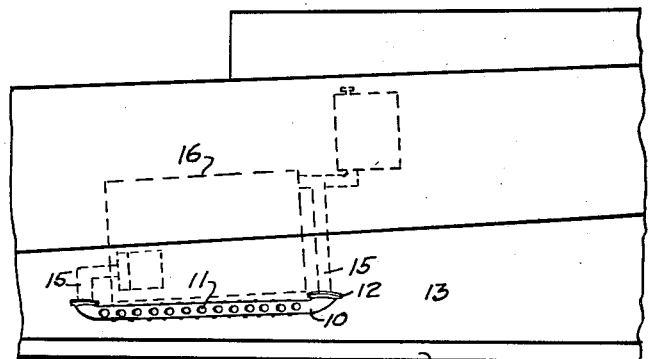
Figure 2:
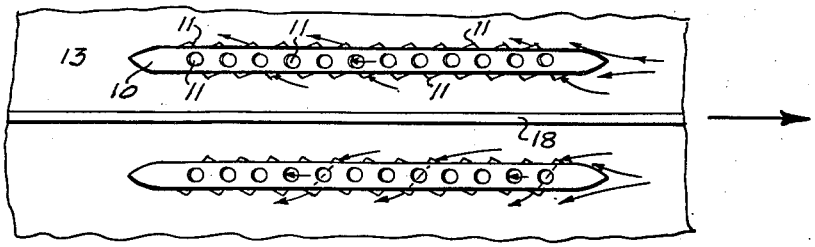
Figure 3:
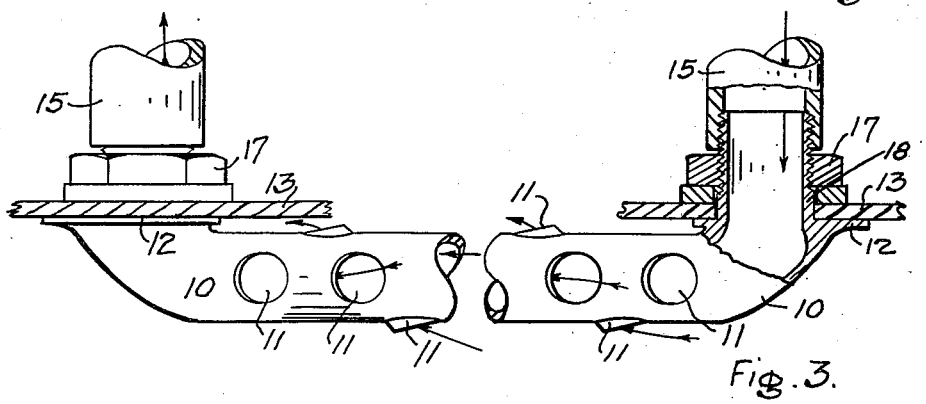

Fig. 1 is a side elevation of a part of a motor boat showing one of my devices mounted thereunder; Fig. 2 is a bottom plan view of such a boat, showing it equipped with two of my devices; Fig. 3 is a larger view of parts of my device partly in section; Fig. 4 is a cross-section of a motor boat showing two of my devices installed thereunder; and Fig. 5 is an enlarged view of a typical section of my device, a part being shown in section.

Identical numerals of reference refer to the same parts throughout the several views.

Many devices have been made for the purpose of cooling the circulating engine water through the agency of the relatively cold water in which the boat is floating, but they usually involve many pipe connections and have to be assembled or constructed on the boat bottom, thus calling for the expenditure of much skilled labor, time and money, which exert a large resistance to the motion of the boat through the water, and which are of so low an efficiency that they must be quite large in extent, involving many feet of piping.

It is for the purpose of overcoming the above and other deficiencies in the present practice that I have devised the following described integral structure.

Essentially this device comprises a cast tube 10 of suitable material and of sufficient size to accommodate the easy flow of the engine circulating water, or coolant, and passing through and across this tube 10 are a plurality of open-ended tubes 11 of smaller diameter. The axes of these tubes 11 are set at an angle of about 45° with the axis of the tube 10 and may be arranged in a plurality of rows. As seen in Fig. 5, the open ends of the tubes 11 are parallel and are cut off at an angle of about 60° to the axes of the said tubes 11 and are so placed in the holes formed in the tube 10 for their reception, that the aft edges of the forward lying ends and the forward edges of the aft lying ends of the tubes extend a short distance out from the surface of the tube 10 while the opposite edges thereof are flush with the surface of the said tube 10.

The result of this construction is to form, at the forward ends of the said tubes 11 slight scoops which guide and force the relatively moving cold water to pass through the smaller tubes 11, and at the rearward ends of these tubes 11 this construction causes a suction as the boat is moved through the water, thus the cold water is caused to pass through the said smaller tubes 11 very swiftly, thus carrying off the heat from the surrounding circulating water in the tube 10.

The two ends of the tube 10 are turned at right angles towards the boat and are provided with flanges 12 adapted to butt against the boat bottom 13 and having screw-threaded extensions 14, passing through the boat bottom 13, to which suitable piping 15 to and from the cooling system of the marine engine 16. The nuts 17 hold the cooler flanges 12 tightly against the boat bottom 13 and prevent leakage through the holes formed therein.

Since my improved circulating water cooler is of integral construction and can be bought completely constructed and ready for installing on the boat, and is very strong and rugged, the only labor connected with its installation is to make two holes of suitable size and position, through which the extensions 14 will snugly pass into the interior of the boat, apply the nuts 17 thereto, and connect the piping 15 to the extensions 14 and to the engine cooling system.

Normally a single cooling tube 10 is used, but under certain circumstances two such tubes may be used, one on each side of the keel 18, for use either with a single engine, as shown, or with two marine engines.

The above described water coolers are made in right-hand and left-hand form, and are mounted under the boat in such manner that the forward ends of the tubes lie adjacent to the keel 18 of the boat, thus lying in the stream of water forced laterally by the shape of the boat bottom, as indicated by the arrows in Figs. 2 and 4.

The form and shape of the several parts of my improved water cooler are such as to exert the least resistance to the motion of the boat in the water.

The form of the cooling tubes 11 are such as to be substantially equally efficient whether the boat is moving forward or backward, the only difference being that the water may not pass through the tubes 11 at as high a speed, in backing, due to the fact that it is moving towards, rather than away from, the keel.

It is, of course, to be understood that changes may be made in the construction of my improved water cooler as above shown and described, without departing from the spirit of my invention as outlined in the appended claim.

Having described my invention, what I claim and desire to secure by Letters Patent, is:

In a boat having a keel and a water-cooled engine provided with water intake and outlet ports; a closed cooling system for said water, comprising a tube adapted to be attached to the exterior of the boat below its water line adjacent the keel and secured at its opposite ends to said intake and outlet ports to form a closed cooling water circuit, and a plurality of cooling pipes extending transversely through said tube at an oblique angle to the longitudinal axis of the latter, the cooling pipes projecting from the tube to form water scoops at their leading ends whereby the water surrounding the boat is driven through said pipes as the boat is propelled, the scoop ends of the cooling pipes facing the boat keel whereby to receive the water projected laterally outward from said keel as the boat is propelled.

THOMAS MAIRS.

REFERENCES CITED

The following references are of record in the file of this patent:

UNITED STATES PATENTS

| Number | Name | Date |
|---|---|---|
| 101,923 | Rowe | Apr. 12, 1870 |
| 968,385 | Morgan | Aug. 23, 1910 |
| 1,266,455 | Gordon | May 14, 1918 |
| 2,258,526 | Walter | Oct. 7, 1941 |
| 2,382,218 | Fernstrum | Aug. 14, 1945 |

FOREIGN PATENTS

| Number | Country | Date |
|---|---|---|
| 106,727 | Great Britain | June 7, 1917 |